Patented Dec. 25, 1934

1,985,264

UNITED STATES PATENT OFFICE 1,985,264

PROCESS OF COMBINING HARDENABLE PHENOL ALDEHYDE CONDENSATION PRODUCTS AND AIR DRYING OILS

Fritz Seebach, Erkner, near Berlin, Germany, assignor to Bakelite Gesellschaft mit beschrankter Haftung, Berlin, Germany No Drawing. Application June 20, 1931, Serial No. 545,839. In Germany July 7, 1930

7 Claims. (Cl. 260—4)

In prior applications Ser. No. 427,993 filed Feb. 12, 1930 and Ser. No. 446,794 filed April 23, 1930 there are described processes for combining hardenable phenol-aldehyde condensation products with air-drying oils. According to the first of these applications an oxidized fatty oil, for example air-blown linseed oil, is heated with the condensation product with an appropriate solvent; the other application describes combining an untreated fatty oil and in particular tung oil with the condensation product by heating in the presence of a solvent. In these processes the fatty oil dissolves with the condensation product in a common solvent for both and the solution is heated for some time at temperatures of about 80 to 130° C.; higher temperatures are not advisable.

We have now made the discovery that the change, which in this process leads to the combination of a phenol-aldehyde condensation product with a fatty oil, can be materially hastened if certain catalysts are used. A specific catalyst of this nature is found to be iodine. The possibility of accelerating this change by catalysts is surprising since it could not be foreseen that a change occurring in two bodies of high molecular weight such as a condensation product and a fatty oil can be influenced by catalysts.

Example 1

100 parts resole (i. e. a resinoid or hardenable phenol-aldehyde or other resinous condensation product in the A-state), 200 parts cyclohexanol, 100 parts wood oil and 2 parts iodine (dissolved in 20 parts cyclohexanol) are heated to about 130° C. The combination of the resole with the wood oil is completed after 40 minutes. A comparative test without a catalyst requires about 80 minutes.

Example 2

100 parts resole, 200 parts cyclohexanol, 100 parts wood oil and Stand oil mixture, 1 part iodine (dissolved in 20 parts cyclohexanol) are heated to about 130° C. The conversion between the resole and the wood oil and Stand oil mixture is completed in 62 minutes. In carrying out the reaction without adding the catalyst under otherwise like conditions, the combination between condensation products and fatty oil is completed only after 2 hours and 6 minutes.

Instead of iodine one may also use iodine monochloride, iodine trichloride ($ICl_3$), iodine fluoride ($IF_5$) as well as other compounds, for example such containing iodine from which the iodine is readily separated like iodized starch. Likewise other fatty oils known to the paint and varnish industry like linseed, rapeseed, etc. can be substituted in whole or in part for wood oil.

I claim:

1. Process of preparing compositions from a hardenable phenol aldehyde resinous condensation product and a fatty oil which comprises heating the phenolic product substantially in the A state with wood oil in cyclohexanol and in the presence of iodine.

2. Process of preparing compositions from a phenol aldehyde condensation product and a fatty oil which comprises reacting the condensation product with the fatty oil in the presence of iodine.

3. Process of preparing compositions from a phenol-methylene condensation product and a fatty oil which comprises heating the condensation product with a fatty oil in a common solvent and in the presence of iodine.

4. Process of preparing a composition from a phenol-aldehyde condensation product and a fatty oil which comprises heating the condensation product and the fatty oil in the presence of an iodine compound releasing the iodine.

5. Process of preparing a composition from a phenol-aldehyde condensation product and a fatty oil which comprises heating the condensation product with the fatty oil in a common solvent and in the presence of an iodine compound releasing the iodine.

6. Composition of matter comprising the reaction product of a phenol-aldehyde condensation product, a fatty oil and an iodine compound releasing the iodine as a catalyst.

7. Composition of matter comprising the reaction product of a phenol-aldehyde condensation product, a fatty oil and an iodine catalyst.

FRITZ SEEBACH.